PULSE GROUP SYNCHRONIZER

Filed Feb. 6, 1956 4 Sheets-Sheet 1

INVENTOR
JOHN C. SIMS, JR.
BY Charles C. English
AGENT

May 17, 1960 J. C. SIMS, JR 2,937,366

PULSE GROUP SYNCHRONIZER

Filed Feb. 6, 1956 4 Sheets-Sheet 2

INVENTOR

JOHN C. SIMS, JR.

BY Charles C. English

AGENT

INVENTOR

JOHN C. SIMS, JR.

BY Charles C. English

AGENT

INVENTOR
JOHN C. SIMS, JR.
BY Charles C. English
AGENT

United States Patent Office 2,937,366

Patented May 17, 1960

2,937,366

PULSE GROUP SYNCHRONIZER

John C. Sims, Jr., Springhouse, Pa., assignor to Sperry Rand Corporation, New York, N.Y., a corporation of Delaware Application February 6, 1956, Serial No. 563,585

28 Claims. (Cl. 340—174)

The present invention relates to data translating apparatus and is more particularly concerned with an improved method and apparatus for the synchronization and realignment of signal pulses received or sent from a multichannel storage tape apparatus or in other forms of multichannel transmission systems.

Information is often recorded on webs or tapes, thereby to provide temporary or permanent storage of the said information. Such information may, for instance, be recorded as magnetized spots, as holes in a web, or as optically observable marks; and in the process of recording, the web or tape is caused to pass adjacent a recording transducer whereby the transducer impresses the desired information on the web.

In many forms of information systems, this recording of information is accomplished in plural channels on the tape or web, and one of the major problems present in such a plural channel recording system is the maintenance of a constant spatial relationship between the recorded pulses. One method of achieving this constant spatial relationship is to utilize a multiple channel head comprising a plurality of spaced individual transducers in conjunction with a recording medium such as a magnetic tape; and such an overall recording system is capable of high speeds of operation while satisfying the requirement of constant spatial relationship between pulses.

When such a multichannel recording system is employed, a further problem is ordinarily presented, and this further problem comprises the maintenance of a constant relationship between the multichannel head and the tape itself. In recording systems of the type described, the storage member or tape is ordinarily caused to pass between guides adjacent the opposed sides of a recording head or transducer; and these guides function to assure, as nearly as possible, a predetermined positional relationship between the transducer and tape during the recording or reproducing step. In practice, however, it has been found that due to variation of tape width during manufacture, or due to wear on the tape guides, to warp and camber of the tape, and/or to distortion of the tape edge or guides, it is extremely difficult to achieve a perfectly constant spatial relationship between the tape and transducer. Inasmuch as the guides must be set to accommodate the greatest possible width of tape so that binding of the tape in the guides will not occur, the tape may be subject to some angular variation in the guides as it passes adjacent to the transducer. This possible angular variation of the tape relative to a recording or reproducing transducer is commonly known as tape "skew," and such skew may in fact be cumulative between an original recording operation and a subsequent reproducing operation, or when a tape recorded on one machine is read on another machine. Such skew, of course, poses one of the major difficulties encountered in multichannel systems of the type described, in that time misalignment of the plural recording or reproducing channels can occur; and the way in which this time misalignment may in fact occur cannot be predicted and will not be repeated from pass to pass.

The effect of such tape skew may be more readily appreciated from a consideration of some of the characteristics of such skew. Due to limitations and present tolerances in the fabrication and assembly of the aforementioned tape guides and storage medium, for instance, the total cumulative displacement comprising the tape skew, in a typical recording system, can be held to a minimum of about five or six mils. Since there is little hope for much improvement in this mechanical error, electrical recording and reproducing systems are ordinarily designed to tolerate this amount of skew. One typical such prior art system, adapted to tolerate skew, so records information that the length of a pulse envelope is greater than the maximum possible skew error. In addition, in such a known system, a sprocket pulse is ordinarily recorded as near the center of the tape as possible and this sprocket pulse is used to reset a row of flip-flops, each of which has been set by a corresponding channel pulse. These sprocket pulses in fact reset the flip-flops at a point near the end of the pulse time cycle whereby the flip-flops thereafter transmit the pulses simultaneously through differentiators to another group of flip-flops whose outputs may be read in whatever manner is desired.

As mentioned previously, the maximum displacement or skew in known mechanical systems may be in the order of five or six mils, whereby the maximum displacement about the center of the reproducing transducer is of the order of two and a half, or three, mils. As long as the width of the recorded pulse is greater than this length, some portion of the pulse is available for setting the aforementioned flip-flops according to the known method of skew toleration. Since the pulse space is twice the width of the pulse, it follows that this pulse space must be greater than six mils to avoid error. In present recording systems, therefore, a pulse density of about 128 pulses per inch is employed, corresponding roughly to a pulse space of eight mils. It will be appreciated that at a density of 150 pulses per inch, the pulse space is reduced to 6⅔ mils in width, and error becomes probable.

Presently known tapes and magnetic heads, however, are capable of recording pulses with good resolution at densities substantially in excess of 500 pulses per inch; but if any such pulse density were attempted in systems known heretofore, a space-time error of as much as five pulse spaces could occur between the outer channels of a seven channel recorded tape as they are read by a multichannel head. Thus, notwithstanding the possibility of high pulse density recordings, the tape skew ordinarily found in recording systems severely limits the practical pulse density to but a small fraction of this maximum possible pulse density, whereby recording systems known at the present time utilize the recording medium in a most inefficient manner; and in addition, the overall system is relatively slow in the recording and reproduction of information.

The present invention is directed primarily toward providing a method and apparatus for correcting positional errors due to tape skew whereby the aforementioned high pulse densities can be effectively employed.

It is accordingly an object of the present invention to provide an improved method and apparatus for the recording and reproducing of information at higher pulse densities than has been the case heretofore.

A further object of the present invention resides in the provision of means providing realignment of displaced pulses which occur at high recording speeds and at high pulse densities on storage devices such as magnetic tapes.

A further object of the present invention resides in the provision of an improved apparatus for the resynchronization of simultaneously transmitted pulses appearing on a plurality of lines.

Still another object of the present invention resides in the provision of a skew compensated recording and reproducing system.

Another object of the present invention resides in the provision of an improved magnetic tape recording system having means compensating for possible mechanical skew during the recording and/or reproduction of information on the said tape.

Still another object of the present invention resides in the provision of an apparatus and method for the reading or sensing of time displaced, simultaneously transmitted pulses, which method and apparatus does not require any realignment or proportional delay of the pulses before reading or sensing.

A still further object of the present invention resides in the provision of means for the direct reading or sensing of time displaced pulses, which means is digital and therefore exact in its mode of discrimination.

Still another object of the present invention resides in the provision of an improved method and apparatus for the rapid direct reading or sensing of a plurality of simultaneously transmitted pulses having a proportionate time displacement wherein the time displacements between two or more pulses is greater than a single pulse time.

Still a further object of the present invention resides in the provision of an improved magnetic tape recording system having better operational characteristics and capable of more efficient operation, of higher speeds of operation, and of higher pulse density storage than has been the case heretofore.

In providing for the foregoing objects, the present invention contemplates the provision of a tape recording system of the multichannel type wherein a control signal is impressed upon the tape during the recording of information signals; and this control signal is subsequently employed to determine the amount of mechanical skew in the system, and to compensate therefor. In practice, the control signal may be impressed upon a pair of channels disposed respectively adjacent the opposing elongated edges of the recording tape or web; and these control signals may take the form of spaced sprocket pulses in each of the control channels, with each such sprocket pulse in each channel having a corresponding sprocket pulse in the other control channel. A plurality of information channels or tracks may be disposed intermediate the control channels and substantially parallel thereto; and the signals appearing in the said control channels and information channels may be read simultaneously, for instance by a multichannel magnetic transducer.

In providing for the aforementioned skew compensation, a plurality of plural-stage storage devices, such as a plurality of shift registers, are employed; and the output of each channel of the said multichannel magnetic transducer is coupled to one of the shift registers respectively whereby information to be realigned may be stored, in its skewed configuration, in said registers. When skew is present in the tape, the sprocket pulses in one of the control channels will be positionally advanced with respect to the sprocket pulses in the other control channel; and the number of such sprocket pulses which are advanced in a given control channel is in turn representative of the amount of mechanical skew in the system.

Due to this consideration, therefore, the present invention contemplates the provision of a control circuit which is responsive to leading sprocket pulses appearing from either of the two control channels, and these leading sprocket pulses are employed initially to shift stored information in the aforementioned storage devices or shift registers. The skewed multichannel information appearing from a tape or the like is fed into the storage devices in its skewed configuration, and the aforementioned sprocket pulses act to shift this information, in its skewed configuration, along the registers. Occurrence of a first lagging sprocket pulse, or a simultaneous occurrence of sprocket pulses from both control channels serves to halt this shift operation whereby the final storage position of information in the shift registers is itself skewed and corresponds to the effective skew of the information channels. This simultaneity of sprocket pulses, or occurrence of lagging sprocket pulses, is thereafter employed to gate preselected positionally skewed stages of the aforementioned shift registers whereby the formerly misaligned pulses appear simultaneously on a plurality of output lines.

The overall arrangement is thus characterized by a register system employing a plurality of plural-stage storage devices wherein misaligned pulse type information is selectively stored in its skewed configuration in appropriate stages of the overall register; and these appropriate stages are then gated simultaneously to effect the desired synchronization of pulses.

The foregoing objects, advantages, construction and operation of the present invention will become more readily apparent from the following description and accompanying drawings, in which.

Figure 1:
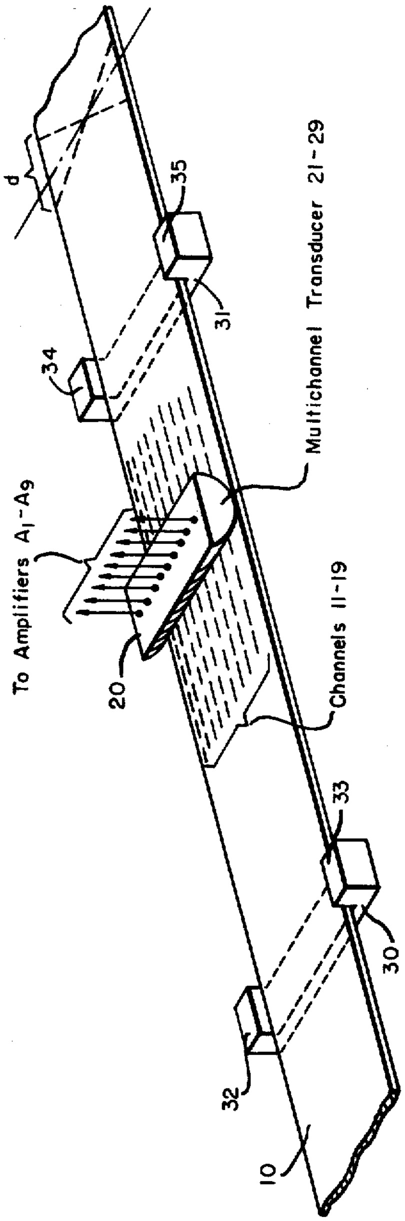
Figure 1 is illustrative of a multichannel recording and reproducing system constructed in accordance with the present invention.

Referring now to Figure 1, it will be seen that, in accordance with the present invention, a tape 10, for instance of magnetic material, may be adapted to record information in a plurality of channels identified as 11 through 19 inclusive; and such recording may be effected by causing the said tape to pass adjacent a transducer 20 having a plurality of channels 21 through 29 inclusive. Transducer 20 may in fact be adapted to both record and read information in the plural channels 11 through 19; or may be singly adapted to either operation.

Tape 10 is ordinarily guided adjacent transducer 20 by a pair of guide assemblies 30 and 31 having guide blocks 32—33 and 34—35 respectively. The arrangement is such that under normal circumstances, the transducer 20 is disposed substantially transverse to the direction of motion of tape 10 or at some predetermined and fixed angle thereto, whereby the time of occurrence of pulses coupled to the transducer elements 21 through 29 will be effected as a corresponding positional disposition of pulses in the several channels 11 through 19.

As discussed previously, the tape 10 may, at times and for a number of reasons, be relatively loosely confined in the guide assemblies 30 and 31. When such loose confinement is present, the position of tape 10 in passing adjacent transducer 20 is not uniquely defined or maintained. For example, the tape 10 may run in contact with guide blocks 32 and 35 or in contact with guide blocks 33 and 34; and may in fact run in one position during a first pass and in the other position during a second pass, thereby causing a cumulative skew error *d*. When this form of tape operation occurs, a considerable timing error is introduced between the recording and reproducing of information on the several channels 11 through 19.

Thus, even though pulses might have originally been recorded simultaneously in channels 11 through 19 for instance, the mechanical skew described will result in pulses in channel 11 arriving adjacent transducer 20 at a time prior to simultaneously recorded pulses occurring in channel 19, or vice versa; whereby, notwithstanding an original simultaneity of recording, the mechanical skew introduced due to the necessary spacing of the guide blocks 30 and 31, will result in the destruction of this simultaneity or synchronization. Outermost channels 11 and 19 are, of course, most sensitive to this skew, and channels intermediate these outermost channels will be advanced or retarded by proportional amounts.

The aforementioned skew errors may be compensated in accordance with the present invention by recording sprocket pulses in the outermost channels 11 and 19 during the recording of information on the intermediate channels, such as 12 through 18. These sprocket pulses take the form of pulses simultaneously recorded in each of the outermost control channels 11 and 19; and the said sprocket pulses are utilized during a subsequent reproducing operation to determine whether skew has occurred, and to further determine the amount and sense of this skew. If, during a reproducing operation, corresponding sprocket pulses should be simultaneously and immediately detected in each of the control channels, no skew has occurred and no compensating control need be effected. If, on the other hand, mechanical skew does occur, the sprocket pulses in one of the control channels 11 or 19 will be positionally advanced from their corresponding sprocket pulses in the other of the said control channels 11 or 19; and the number of such pulses which are advanced is directly indicative of the amount and direction of skew which has occurred between the recording operation and a subsequent reproducing operation.

This possible variation in sprocket pulse time occurrence is, therefore, utilized, in accordance with the present invention, to shift detected information signals in a plurality of storage registers until a lagging sprocket pulse occurs, or until sprocket pulses are detected from both control channels, and this latter serves to provide a read-out from the registers employed. Inasmuch as the skewed information has been stored and shifted in the said registers in its skewed configuration, the simultaneous read-out of register stages along a skew line of stages corresponding to the information skew, serves to realign or synchronize the pulses.

Figure 2A:
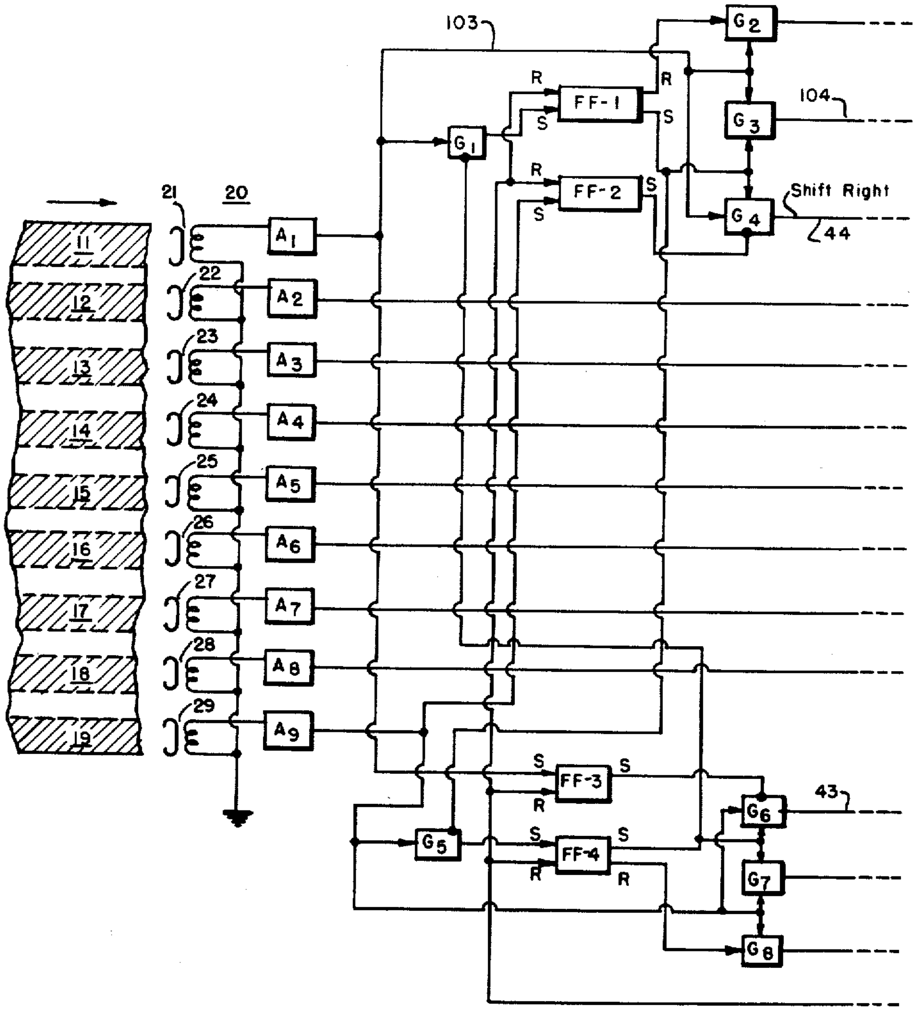
Figure 2 (A and B) is a schematic diagram of a control circuit adapted to provide skew compensation and signal synchronization in accordance with the present invention.
Figure 2B:
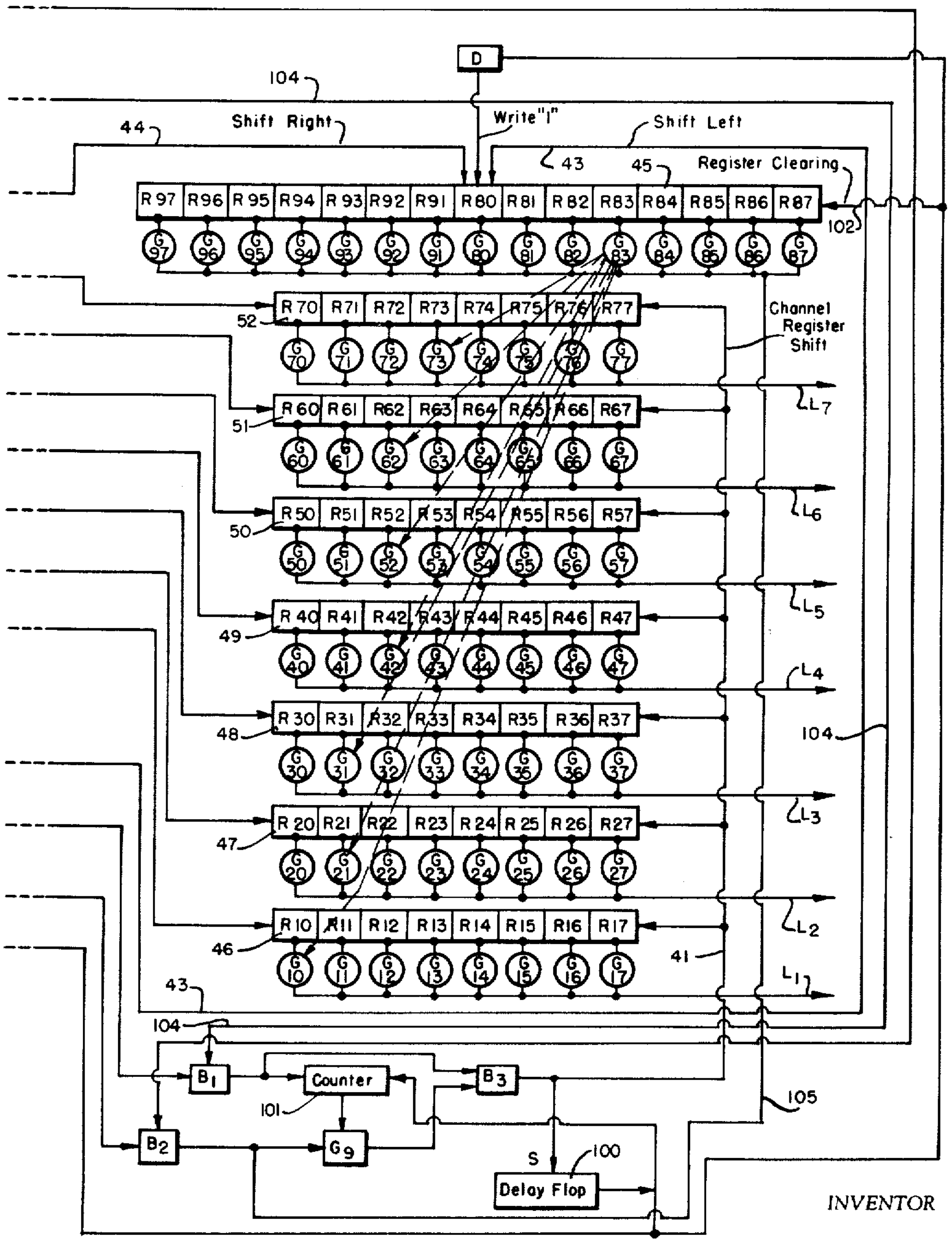

The aforementioned synchronization of misaligned pulses may be effected, in accordance with one embodiment of the present invention, by a circuit of the type illustrated in Figure 2. Thus, referring to Figure 2, it will be seen that, as mentioned previously, a tape 10 having a plurality of tracks 11 through 19 may be caused to pass adjacent a transducer 20, comprising a plurality of pole pieces 21 through 29. In practice, the channels 11 and 19 contain sprocket pulses, while the intermediate channels 12 through 18 contain information signals. The outermost transducer elements 21 and 29 thus produce at their outputs spaced pulses corresponding to the sprocket pulses previously recorded in tape 10 and these sprocket pulses may be coupled, as shown, via amplifier A1 and A9 to the illustrated control circuit. The output of amplifier A1 is in fact coupled to the set terminal of a flip-flop FF–3, and is also coupled to the input of an inhibition type gate G1 as well as to one input of gates G2, G3 and G4, respectively. Similarly, the output of amplifier A9 is coupled to an input of inhibition type gate G5, to further inputs of gates G6, G7 and G8, and to the set input terminal of a flip-flop FF–2.

Examining the particular network shown in Figure 2 in more detail, it will be seen that the output of gate G1 supplies a set input to flip-flop FF–1, while the set output of the said flip-flop FF–1 supplies inputs to permissive gate G3 and to inhibition gate G4, and also supplies an inhibition control input to gate G5. Flip-flop FF–1 also selectively supplies a reset output which is coupled to gate G2. The set output of flip-flop FF–2 is coupled to the inhibition terminal of gate G4.

Similarly, the output of gate G5 acts as a set input to flip-flop FF–4, and the set output of the said flip-flop FF–4 is coupled to the inputs of inhibition gate G6 and coincidence G7, as well as to the inhibition terminal of gate G1. Flip-flop FF–4 also selectively supplies a reset output which acts as an input to coincidence gate G8. The several flip-flops FF–1, FF–2, FF–3, and FF–4 are supplied in common with a reset input effected, as will be described, from the output of a delay flop 100.

Continuing our examination of the circuit shown in Figure 2, it will be seen that the output of gate G2 is coupled to the input of a buffer B2 and the said buffer B2 is also supplied with a further input from the output of gate G8. The output of gate G3 is coupled to the input of a buffer B1 and the said buffer B1 is selectively supplied with a further input from the output of gate G7. The output of buffer B1 is coupled to a pulse counter 101, as well as to one input of a buffer B3; and the output of counter 101 acts to provide an input to a coincidence gate G9 after a predetermined number of pulses, corresponding to a recorded word, have been counted. The other input to the said coincidence gate G9 is taken from the output of buffer B2, and the said buffer B2 also supplies one input to gates G80–G87 and G91–G97. The output of buffer B1 is, as mentioned, also coupled to the input of buffer B3 and the said buffer B3 is further supplied with an input from the output of gate G9. The output of buffer B3 is coupled to delay flop 100 to set the said delay flop, and is also coupled via line 41 to the several channel shift registers 46 through 52 inclusive, which will be described in greater particularity subsequently.

As mentioned previously, delay flop 100 provides a reset input to the several flip-flops FF–1 through FF–4 inclusive. This delay flop 100 further supplies selectively a reset input to counter 101, and also supplies a register clearing input, at line 102, to the sprocket register 45 which will be described with greater particularity subsequently. Finally the output of delay flop 100, when it occurs, is coupled via a delay means D to a register position R80 in the sprocket register 45 for selectively writing a "1" into that register position. The said sprocket register 45 is selectively supplied with shift-right signals from the output of gate G4, or with shift-left signals from the output of gate G6.

Before examining in detail the precise interaction of the several components illustrated in Figure 2, it will be helpful to examine the broad operational characteristics of the overall circuit. Thus, outputs appearing at amplifiers A2 through A8 comprise information signals detected by the transducer elements 22 through 28 inclusive from information signal channels or tracks 12 through 18 inclusive; and these signal pulses are coupled, as shown, to the input of a plurality of plural-stage storage devices 46 through 52 inclusive. Each of the storage devices 46 through 52 may in fact comprise a plural-stage shift register taking a form known in the art, and one appropriate shift register which may be utilized in each of the registers 46 through 52 is described, for instance, in Kaufmann application Serial No. 431,509, filed May 21, 1954, for "Shifting Register Utilizing Magnetic Amplifiers." Each of the registers 46 through 52 has a plurality of stages, and in the particular example chosen for purposes of illustration, each such register comprises eight stages. Thus, register 46 has stages R10 through R17 inclusive; register 47 comprises stages R20 through R27 inclusive; register 48 comprises stages R30 through R37 inclusive, etc.

The output of each register stage is selectively passed to one of the ultimate output lines L1 through L7 inclusive, through permissive or coincidence gating devices associated respectively with each stage of each of said registers. Thus, referring to register 46, it will be seen that the stages R10 through R17 each supply one control input to coincidence gates G10 through G17 inclusive; and the outputs of these gates G10 through G17 are coupled together to the output line L1. Similarly, each stage of the register 47, comprising stages R20 through R27, supplies a control input to the gates G20 through G27 inclusive, and the outputs of these gates are coupled together and to an output line L2. Similar arrangements are present in each of the registers 48 through 52.

The sprocket register 45 may also take the form of a shifting register, and this particular register is so constructed that information therein may be shifted either to the right or to the left of a central position R80. Registers capable of providing such a bidirectional shift are known in the art, and one such register is taught, for instance, in the application of Robert D. Torrey, Serial No. 562,179, filed January 30, 1956 for "Shift Register." Each stage R80 through R87 and R91 through R97 of the sprocket register 45 provides one control input to a plurality of coincidence gates G80 through G87 and G91 through G97; while a second control input to each of the gates G80 through G87 and G91 through G97 is provided, as mentioned previously, from the selective output of buffer B2. The outputs of gates G80 through G87 and G91 through G97 selectively provide control inputs, via a buffer network, to preselected ones of the gates associated with each of the channel registers 46 through 52 inclusive, whereby a chain of gates, respectively associated with the several registers, may be activated simultaneously.

Figure 3:
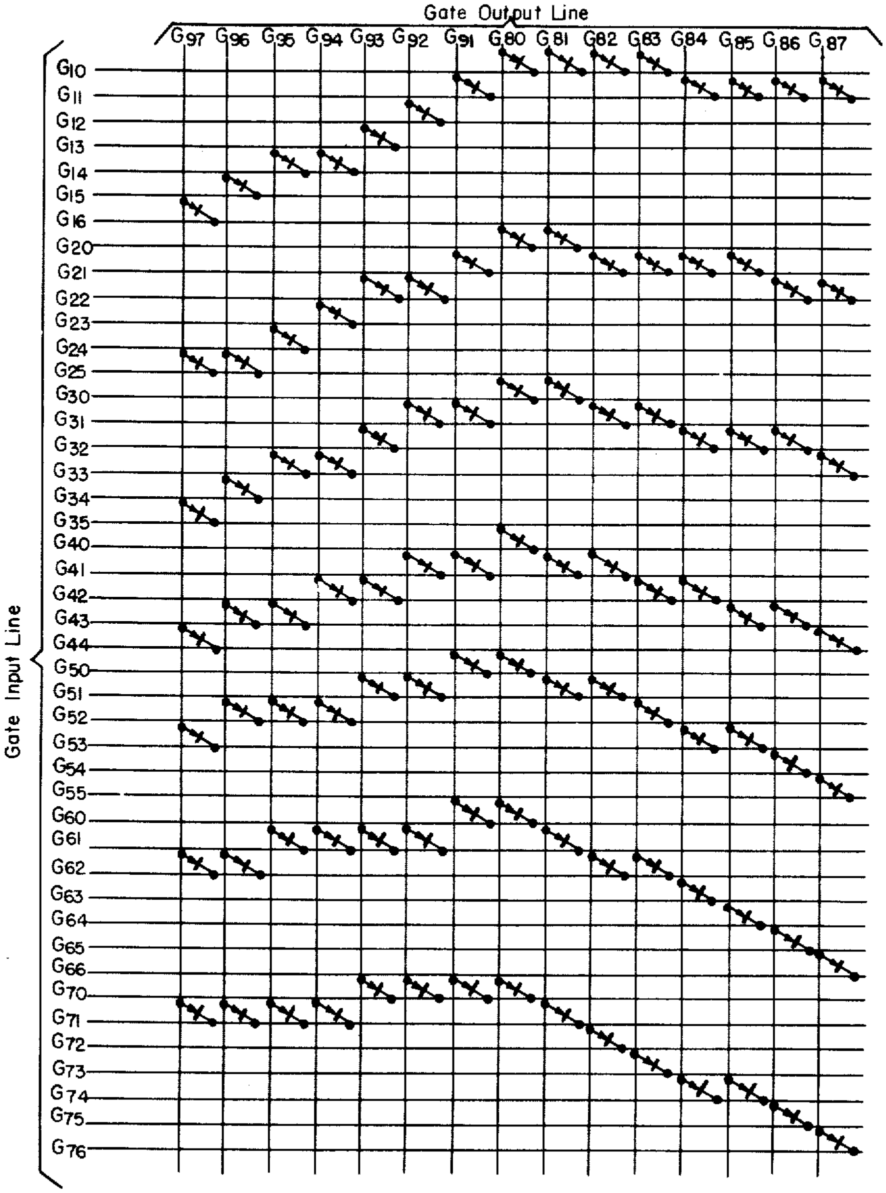
Figure 3 is a schematic diagram of a buffer matrix such as may be employed in the arrangement of Figure 2 for effecting a desired read-out from selected register stages.

For purposes of clarity, the complete interconnection of gate outputs from sprocket register 45 with control inputs to the gates in channel registers 46 through 52 has not been illustrated; but this interconnection may take the form of the matrix illustrated in Figure 3. Thus, by way of example, the output of gate G97, when it occurs, is coupled, via buffers, to a control input terminal in each of the gates G16, G25, G35, G44, G53, G62 and G71. An output from gate G83, when it occurs, is coupled via buffers to a control input in each of gates G10, G21, G31, G42, G52, G62 and G73. This latter disposition of gate outputs and inputs has been shown illustratively by the dotted line representation in Figure 2, this showing being given merely to indicate the fact that the several gates G80 through G87 and G91 through G97 are interconnected, via a buffer matrix, with the several gates in the channel registers 46 through 52 in the manner illustrated in Figure 3. The actual chain of gates which is in fact actuated has a skewed configuration corresponding to the skewed information being interpreted, whereby register read-out occurs on a preselected skew line.

In operation, the sprocket register central stage R80 ordinarily has a "1" recorded therein, while the other stages of the register contain "0's." As the tape 10 is caused to move past transducer 20, sprocket pulses will first appear at the output of either amplifier A1 or at the output of amplifier A9, if there is mechanical skew in the system; and these sprocket pulses, when they occur from one channel without corresponding sprocket pulses from the other channel, are used to shift the "1" recorded in register stage R80 either to the right or to the left of this central stage. The direction of actual shift, and the number of stages through which the originally recorded "1" is shifted, thus provides an indication in the sprocket register 45 of the direction and amount of mechanical skew in the system.

For instance, if the skew should be such that sprocket pulses in channel 11 occur in advance of their corresponding pulses in channel 19, these leading sprocket pulses will pass from the output of amplifier A1 to the network, illustrated in Figure 2, to effect outputs from gate G4 on line 44 whereby the "1" recorded in register position R80 will be shifted to the right during the occurrence of each leading sprocket pulse appearing at the output of amplifier A1. This operation will subsequently be described with greater particularity. When lagging sprocket pulses thereafter appear, or when simultaneous pulses appear at the outputs of amplifiers A1 and A9, the first occurrence of a first lagging sprocket pulse provides a direct indication of the amount of lead of channel 11 with respect to channel 19; and this first lagging sprocket pulse serves to terminate the "shift-right" in register 45, as will be described. The "1" in register 45 will thus remain in its shifted position, corresponding to the amount and sense of the skew in the system, whereby an input is applied, from a stage in register 45, to one of the gates G80 through G87 (for the assumed "shift-right"). The occurrence of lagging sprocket pulses also effects a second control input to each of the gates G80 through G87 and G91 through G97 via buffer B2 (as will be described), and inasmuch as there is but a single "1" in the register 45, one only of the gates G80 through G87 will produce an output pulse for this "shift-right" situation. It will be appreciated that which of these sprocket register gates does so produce an output pulse is indicative of the direction and amount of mechanical skew in the system; for, by analogy, if the skew should be such that channel 19 leads channel 11, the output of amplifier A9 will serve to shift the originally stored "1" to the left of central register position R80, whereby one of gates G91 to G97 produces an output pulse upon the occurrence of simultaneous sprocket pulses.

While the aforementioned shift in the originally recorded "1" of sprocket register 45 is taking place, information signals are being detected by transducer elements 22 through 28 and these information signals pass via amplifiers A2 through A8 to the input of channel registers 46 through 52. Because of the skew, these pulses will be applied to some of the registers prior to the application of pulses to other of the registers. For instance, if the skew is such that channel 11 leads channel 19, whereby channel 12 similarly leads channel 18, information signals will be coupled to the input of register 52 prior to the application of other information signals to the input of register 46. Information signals are thus stored in the several registers in skewed register positions corresponding to the information skew.

Each of the registers 46 through 52 may have information, which is stored therein, shifted to the right by the application of pulses via channel register shift line 41; and these shift pulses appearing on line 41 may come from the output of buffer B3, as will be described. Due to this shifting of the channel registers 46 through 52, the information signals are stored in a skewed configuration corresponding to the tape skew, whereby upon occurrence of an output from one of gates G80 to G87 and G91 to G97, the signal information so stored in the channel register is simultaneously gated to the output lines L1 to L7 from positively skewed register stages, thereby to resynchronize the information signals. It will be appreciated from the foregoing discussion, therefore, that if the mechanical skew was such that channel 11 was in advance of channel 19 whereby the activated control gate in register 45 comprises one of gates G81 through G87, then once a particular plurality of channel register stages are gated to an output producing state, the stages so gated will positionally relate to the skew in the system. Each pulse applied to the channel register shift line serves to transfer new signal information into these activated channel register stages whereby aligned pulses continue to appear simultaneously on lines L1 through L7 with each shift of information into the activated channel register stages.

Examining now with greater particularity the precise circuit shown in Figure 2, let us initially assume, merely by way of illustration, that the several channels 11 through 19 are so skewed that sprocket channel 11 is advanced by three pulses over sprocket channel 19; and that, further, all the information channels 12 through 18 contain signal pulses. A first sprocket pulse will pass through amplifier A1, and thence, via gate G1, to the set input of flip-flop FF-1 whereby the said flip-flop FF–1 produces a set output providing one input to each of gates G3 and G4. The several flip-flops FF–1 through FF–4, to be described, are each adapted to respond to signals of lower amplitude than those required to operate the several gates, such as gates G2 and G5. In this manner, gates such as G2 and G5 can be conditioned or inhibited prior to their effective operation by simultaneous inputs thereto.

The aforementioned output from flip-flop FF–1 further serves to inhibit gate G5 thereby inactivating the several components which depend for their operation upon an output from the said gate G5. This first pulse from the output of amplifier A1 also passes via line 103 to the input of gates G2, G3 and G4; and this signal state in the several gates causes gates G3 and G4 to produce outputs. It should be noted that gate G2 produces no output since flip-flop FF–1 is not in a reset state, while gate G4 does produce an output since flip-flop FF–2 is in a reset state whereby no inhibition is applied to the said gate G4.

The output from gate G3 passes via line 104 to the input of buffer B1 and thence to the input of counter 101 where the said pulse is recorded. The output of buffer B1 is also passed via buffer B3 to the channel register shift line 41 to cause the several channel registers 46 through 52 to shift one position to the right. The output of buffer B3 is also applied to the set input terminal of delay flop 100. This delay flop may assume any conventional form of unbalanced trigger circuit having a time constant greater than a maximum possible input pulse time of the system, whereby the said delay flop is inhibited from producing outputs in response to set inputs thereto, and produces a strong signal output only in the continued absence of a set input thereto for a time period longer than said maximum input pulse time.

To summarize the foregoing, therefore, it will be seen that this first leading sprocket pulse passing via amplifier A1 serves to inhibit an output from delay flop 100 and also serves to shift the several channel registers 46 through 52 one position to the right. This first sprocket pulse from amplifier A1 serves the further function of shifting the sprocket register 45 one position to the right via shift-right line 44, since gate G4 produces an output pulse, as has been described. Thus, for this first sprocket pulse, the "1" which was originally recorded in sprocket register position R80 is shifted to sprocket register position R81; and an information signal pulse appearing at the output of amplifier A2 and supplied to register position R70 in channel register 52, will be concurrently shifted to register position R71, under the control of the pulse in line 41. As a result of the foregoing operation, therefore, after the first sprocket pulse passes amplifier A1, the previously recorded "1" in the sprocket register R80 is shifted to register position R81 and a first signal pulse appearing via amplifier A2 is shifted to register position R71. It should be noted that this first sprocket pulse, in addition to inhibiting gate G5 in the manner described, also provides a set input to flip-flop FF–3, and the output of the said flip-flop FF–3 serves to inhibit gate G6, which inhibition cannot be removed until the cycle of operation is completed and a new cycle is begun.

Second and third leading sprocket pulses appearing via the amplifier A1 will perform a shift operation similar to that already described whereby, after three leading sprocket pulses are detected in channel 11 (these three sprocket pulses being equivalent to the assumed skew in the system) "1's" will be recorded in positions R83, R73, R62, R52, R42, R31, and R21.

With the occurrence of a fourth sprocket pulse via amplifier A1, an information signal will be coupled via amplifier A8 to the register position R10, thereby storing a further signal in that position R10, and a lagging sprocket pulse will also appear for the first time from channel 19 at the output of amplifier A9. For the assumed skew, this first lagging sprocket pulse actually results in the opening of G10, as will be described, so that the information pulse in R10 is immediately gated to line L1 rather than being shifted to register position R11. For other skews, however, the information pulse in R10 would be stored and thereafter shifted to R11 and to subsequent register stages until lagging sprockets occur. For the situation of the assumed skew, however, this first lagging pulse from amplifier A9 acts first to set flip-flop FF–2 whereby the output of the said flip-flop FF–2 inhibits gate G4 and prevents any further "shift-right" in the sprocket register 45.

In short, the aforementioned sprocket register shift occurs only in response to sprocket pulses appearing from one or the other but not both of the sprocket channels; and upon occurrence of sprocket pulses from both channels (actually upon occurrence of the first lagging sprocket pulse), the sprocket register shift ceases. For the assumed state of operation, therefore, the "1" in register 45, which was originally shifted to R83, is caused to remain in stage R83 due to the occurrence of the first lagging sprocket pulse.

Since gate G5 had previously been inhibited by the output of flip-flop FF–1, the first lagging sprocket pulse appearing via amplifier A9 cannot pass through the said gate G5. This first lagging sprocket pulse from amplifier A9 is, however, fed to inputs of gates G6, G7 and G8. Since flip-flop FF–4 is still in its reset state while flip-flop FF–3 is in its set state, only gate G8 produces an output upon occurrence of the first lagging sprocket pulse. This output from gate G8 is coupled via buffer B2 to the input of gate G9 as well as via line 105 to one control input of each of sprocket register gates G80 through G87 and G91 through G97. During this same time interval, amplifier A1 is still producing an output pulse corresponding to a recorded leading sprocket pulse in channel 11, and this output from amplifier A1 can now pass only through gate G3 and thence via line 104 to the buffer B1. The output of buffer B1 still performs the functions already described, in that this output is coupled to the counter 101 and is also coupled via buffer B3 to the channel register shift line 41, to continue the shift-right of the channel registers 46 through 52; and the output of the said buffer B3 is, as before, coupled to delay flop 100 to continue inhibition of a delay flop output.

The first lagging sprocket pulse thus serves to halt the shift-right in sprocket register 45 and also serves to supply a control input via line 105 to the several gates G80–G87 and G91–G97, coupled to the sprocket register stages, while the remainder of the circuit continues to operate as before in response to sprocket pulses from the output of amplifier A1. Inasmuch as channel register 45 contains but a single "1," and inasmuch as this "1" acts as a control input to one only of the gates G80 through G87 and G91 through G97, only a single one of the gates G80 through G87 and G91 through G97 is thereby activated upon occurrence of a control pulse from the output of buffer B2 on line 105. For the assumed skew described above, the "1" in sprocket register 45 is in position R83, whereby only gate G83 produces on output upon occurrence of a pulse on line 105.

In short, the system has functioned to shift the "1" in the sprocket register 45 to a stage and in a direction corresponding to the actual skew of the system; and upon occurrence of a first lagging sprocket pulse, the amount and direction of the skew becomes positively determined, whereby the "1" in sprocket register 45 is no longer shifted and a gate coupled to the actual sprocket register stage containing the shifted "1" produces an output. For the assumed shift, and inasmuch as gate G83 produces an output, controlling inputs are applied via a plurality of buffers from the output of gate G83 to the inputs of gates G10, G21, G31, G42, G52, G62 and G73 (see Figure 3).

The particular channel register gates which are thus supplied with inputs from the output of gate G83 are also supplied with further inputs as a result of signal information previously stored and shifted to the channel register positions corresponding to the activated channel register gates; and as a result, the occurrence of a first lagging sprocket pulse serves to activate a plurality of positionally skewed channel register gates corresponding to the actual information skew in the system whereby signal information is simultaneously passed to the output lines L1 through L7. Each succeeding information pulse consisting of pulse combinations on the channels 12 through 18, is successively gated to the output lines L1 through L7 via the activated gate network already described. Thus the information pulses, which were misaligned at reception due to the assumed skew in the system, are realigned because of the simultaneous gating of these pulses from the skewed register stages to the ultimate output lines L1 through L7.

It should be noted that counter 101 continues to count the pulses in the leading sprocket, namely, the pulses in channel 11 appearing at the output of amplifier A1, throughout the foregoing sequence of operations. The counter 101 is pre-set to respond to the predetermined number of pulses comprising a word of information in the particular application being made of the system; and after the said counter 101 has determined, through a count of the sprocket pulses appearing in a leading channel, that a given record cycle has been completed, this counter 101 produces an output. The output of counter 101 is coupled to one input of gate G9 whereby lagging sprocket pulses, which are already appearing at the output of buffer B2, are coupled via the gate G9 and thence via buffer B3 to shift line 41. This further condition of operation permits the lagging pulses, corresponding in number to the aforementioned leading pulses (three in the assumed sequence) to now assume shift control of the channel registers 46 through 52, as well as to assume further inhibition control of the delay flop 100. As a result of this operation, therefore, even though only lagging sprocket pulses now appear in the system, the channel registers 46 through 52 continue their shift-right, thereby assuring that the information signals stored in the said channel registers are shifted beyond the previously activated positions, and are in fact shifted out of the channel registers; and, in addition, the lagging sprocket pulses continue to inhibit outputs from delay flop 100.

When the last of the three lagging pulses in sprocket channel 19 has so acted, the last information signal in the channel registers will be completely shifted out of the system; and since no more set pulses are applied to the delay flop 100, this delay flop will, after an interval somewhat greater than the maximum pulse time in the system, revert to its original stable state thereby generating an appreciable output signal. The output from delay flop 100 acts to reset counter 101 and each of flip-flops FF–1 through FF–4; and, in addition, acts via line 102 to shift the previously recorded "1" completely out of the sprocket register 45. The output from delay flop 100 is further coupled, after a delay time imposed by delay means D, to the sprocket register stage R80 whereby a "1" is once more written into this sprocket register stage R80. As a result of the foregoing sequence, therefore, all the channel registers 46 through 52 are cleared and the sprocket register 45 has a "1" once more stored at its central position whereby the overall circuit is in condition to receive and resynchronize a further word of pulse information.

The foregoing description has, of course, assumed that the tape skew is such that channel 11 leads channel 19. Due to symmetry in the circuit, however, a like resynchronizing operation occurs when channel 19 leads channel 11. In this latter event, leading sprocket pulses from channel 19 initially effect outputs from gate G6 on line 43, which serve to shift the stored "1" in sprocket register 45 to the left whereby, eventually, one of gates G91 to G97 is activated to effect a gating of selected positionally skewed stages of channel register 46–52 to output lines L1 to L7. In other aspects, the circuit operation is as has been described.

While the above description relates to a preferred embodiment of the present invention, many variations will be suggested to those skilled in the art. In particular, although the invention has been illustrated in reference to seven information channels, it must be understood that by suitable modification, the device may serve to compensate for misalignment in more or less channels of information, and can further realign pulse groups having a larger or smaller anticipated deviation in alignment than that described above. The above description is therefore meant to be illustrative only and should not be considered limitative of my invention; and all such modifications as are in accord with the principles described, are meant to fall within the scope of the appended claims.

Having thus described my invention, I claim:

1. In a skew compensated recording and reproducing system, an elongated information storage member having a pair of spaced control tracks and an information signal track, each of said control tracks having control signals stored therein, a tranducer adjacent said storage member for deriving said control signals from said control tracks and for deriving information signals from said information track, variations in the occurrence times of control signals from said pair of spaced control tracks being indicative of mechanical skew of said storage member relative to said transducer, a shift register, means coupling said information signals to said shift register, means responsive to initial occurrence of control signals from one only of said pair of tracks for shifting said information signals in said register, and means responsive to subsequent occurrence of control signals from the other of said pair of tracks for effecting an information signal output from said shift register.

2. The system of claim 1 wherein said control tracks and said information track are substantially parallel to one another, said information signal track being located between said control tracks.

3. The system of claim 2 wherein said storage member comprises a magnetic tape, and said transducer comprises a magnetic transducer.

4. In a recording and reproducing system, an elongated information storage member having a plurality of information channels and a pair of spaced control tracks, said control tracks having spaced control signals therein with each control signal in one of said tracks having a corresponding control signal in the other of said tracks, tranducer means adjacent said storage member for deriving said control signals from said control tracks, the position of said storage member and transducer means being variable with respect to one another with variations in said relative position being characterized by variations in the relative occurrence times of corresponding control signals derived by said transducer means from said pair of control tracks, a plurality of plural-stage shift registers, means coupling information signals in said plurality of channels to the inputs of said shift registers respectively, means responsive to an occurrence of control signals from one of said control tracks for simultaneously shifting the information signals stored in each of said registers, and means responsive to occurrence of control signals from the other of said control tracks for effecting an information output from a preselected stage in each of said registers.

5. The combination of claim 4 including a plurality of gates coupled respectively to the plural stages in said plurality of registers, said means responsive to control signals from the other of said tracks comprising means producing a gating signal for selectively opening a preselected one of said gates in each of said registers.

6. The combination of claim 22 wherein said further shift register has a gating signal originally stored at an intermediate stage thereof, means responsive to control signals from one only of said control tracks for selectively shifting said gating signal in one direction from said intermediate stage, and means responsive to control signals from the other only of said tracks for selectively shifting said gating signals in the other direction from said intermediate stage.

7. The combination of claim 6 wherein said storage member comprises an elongated magnetic tape, said spaced control tracks being disposed adjacent the opposed elongated edges of said tape respectively.

8. In a signal synchronizing system, an elongated storage member having a pair of spaced control signal tracks, a plurality of spaced information signal tracks disposed between said control signal tracks, a transducer for reading control signals from said pair of control signal tracks whereby initial occurrence of simultaneous signals from both said control tracks is indicative of a desired relative positioning of said storage member and transducer means while initial occurrence of a signal from one only of said tracks is indicative of mechanical skew between said storage member and transducer, a plurality of plural-stage information storage devices, means coupling signals in said plurality of signal tracks to a preselected stage in each of said plurality of storage devices respectively, means responsive to initial occurrence of control signals from one only of said control tracks for transferring information signals stored in said preselected stages to other stages of said storage devices respectively, and means responsive to subsequent occurrence of control signals from the other of said control tracks for simultaneously reading the information stored in a selected stage of each of said storage devices.

9. The system of claim 8 wherein each of said storage devices comprises a shift register.

10. The system of claim 23 wherein said means responsive to the occurrence of control signals in both of said tracks comprises a permissive gating device producing an output pulse in response to a coincidence of control signal inputs thereto, and means responsive to said output pulse for causing one stage of each of said storage devices to be in a possible output producing state.

11. The system of claim 23 including a multi-channel magnetic transducer adjacent said tape, and means coupling individual channel outputs of said transducer to said plurality of storage devices respectively.

12. The system of claim 23 wherein each of said storage devices comprises a shift register.

13. In a skew compensated reproducing system, an elongated tape having spaced control signals therein, said tape further having information signals therein, a plural-stage storage device, means coupling said information signals to an input of said storage device, means responsive to variations in the occurrence time of said control signals for variably transferring said stored information signals to a selected stage of said storage device, and means for thereafter reading the information stored in said selected stage.

14. The system of claim 13 wherein said control signals are disposed in two distinct channels spaced from one another in the direction of elongation of said tape, said information signals being disposed in a further channel located between and substantially parallel to said control channels.

15. The system of claim 14 wherein said tape comprises a magnetic material, said means coupling said information signals to said storage device comprising a magnetic transducer.

16. The system of claim 15 wherein said storage device comprises a shift register.

17. In a skew compensated recording and reproducing system, an elongated tape having a pair of spaced control signal tracks, the control signals in each of said tracks having corresponding control signals in the other of said tracks, a plurality of information signal channels in said tape, a plurality of plural-stage storage devices, means coupling the information signals in said plurality of channels to said plurality of storage devices respectively, means responsive to a time misalignment between corresponding control signals in said pair of tracks for variably transferring said stored information signals to selected stages in said storage devices respectively, and means for thereafter reading simultaneously the information stored in said selected stages.

18. The system of claim 17 wherein said tape is a magnetic tape.

19. The system of claim 18 wherein each of said storage devices comprises a shift register.

20. In a skew compensated recording and reproducing system, an information storage member having a plurality of juxtaposed signal tracks disposed thereon, a multi-element transducer disposed in registry with a multiplicity of said tracks for deriving signals therefrom, shifting register means coupled to said multi-element transducer, means responsive to the ocurrence of signals from one of the end tracks in registry with the transducer for shifting the signals in said shift register means, and means responsive to the occurrence of signals from the opposing end track in registry with the transducer for effecting an output from said shift register means.

21. The system of claim 20 wherein said storage member includes a magnetic tape.

22. In a recording and reproducing system, an elongated information storage member having a plurality of information channels and a pair of spaced control tracks, said control tracks having spaced control signals therein with each control signal in one of said tracks having a corresponding control signal in the other of said tracks, a plurality of plural-stage shift registers, a plurality of gates coupled respectively to the plural stages in said plurality of registers, means coupling information signals in said plurality of channels to the inputs of said shift registers respectively, means responsive to occurrence of control signals from one of said control tracks for simultaneously shifting the information signals stored in each of said registers, means responsive to occurrence of control signals from the other of said control tracks for producing a gating signal for selectively opening a preselected one of said gates in each of said registers thereby to effect an information output from a preselected stage in each of said registers, said means for producing a gating signal comprising a further plural-stage shift register, a further plurality of gates coupled respectively to the plural stages in said further register, and a buffer matrix coupling said further plurality of gates to control inputs of said first mentioned plurality of gates.

23. In a signal synchronizing system, an elongated storage member comprising a magnetic tape having a pair of spaced control signal tracks, control signals in said tracks comprising spaced pulses magnetically stored in said tape, a plurality of spaced information signal tracks disposed between said control signal tracks, a plurality of plural-stage information storage devices, means coupling signals in said plurality of signal tracks to a preselected stage in each of said plurality of storage devices respectively, means responsive to the occurrence of control signals in one only of said control tracks for transferring information signals stored in said preselected stages to other stages of said storage devices respectively, and means responsive to the occurrence of control signals in both of said tracks for simultaneously reading the information stored in a selected stage of each of said storage devices.

24. In a skew compensated reproducing system, an information storage member having a pair of control tracks and also having a plurality of information tracks, transducer means for reading control signals from said control tracks and for reading information signals from said information tracks, said control tracks each having a plurality of control signals stored therein with the control signals in each of said tracks having corresponding control signals in the other of said tracks, whereby said transducer means is initially operative to read corresponding signals from both said control tracks in the absence of skew and said transducer is initially operative to read control signals from one only of said control tracks in the presence of skew, storage means having a plurality of storage positions, means coupling information signals from the output of said transducer means to the input of said storage means, means responsive to initial occurrence of control signals from one only of said control tracks for temporarily storing said information signals in said storage means, said last-named means including means responsive to the number of control signals initially occurring from said one only of said control tracks for determining the stored position of said information signals in said storage means, and means responsive to subsequent occurrence of control signals from the other of said tracks for reading the information stored in selected positions of said storage means.

25. The combination of claim 24 wherein said means for determining the stored position of said information signals in said storage means comprises shifter means responsive to said control signals from one only of said control channels for shifting the position of said information signals in said storage means, counter means for counting control signals from said one control channel, and means responsive to a predetermined count by said counter means for rendering said shifter means responsive to control signals from the other of said control channels.

26. In a skew compensated reproducing system, an information storage member having a plurality of control and information channels having control and information signals respectively stored therein, transducer means adjacent said storage member, the position of said transducer means relative to said storage member being variable and variations in said relative position being indicated by variations in the occurrence times of said control signals at the output of said transducer, storage means having plural storage positions, means for coupling information signals from said transducer means to said storage means, means responsive to said variations in the occurrence times of said control signals for temporarily storing said information signals at positions in said storage means determined by the magnitude of said occurrence time variations, and means for thereafter reading the information stored in selected positions of said storage means.

27. In combination, an information storage member having information signals stored therein, said member also having a pair of control channels having control signals stored therein, transducer means adjacent said member for reading said information signals and for also reading the control signals in said pair of control channels, the control signals in one of said channels being advanced in time of reading with respect to the control signals in the other of said channels whereby said transducer means reads the control signals from said one control channel in advance of the reading of said control signals from said other control channel, storage register means, means coupling said information signals from said transducer means to said storage register means for temporarily storing said information signals in said storage register means, means responsive to the reading of said advance signals from said one control channel for shifting said information signals in said storage register means, and means responsive to the subsequent reading of said control signals from said other control channel for transferring said stored and shifted information signals out of said register means.

28. In a skew compensated reproducing system, a storage member having a pair of spaced control signal tracks carried thereby, said storage member further having a plurality of spaced information signal tracks carried thereby, a plurality of plural-stage storage devices, means coupling information signals from each of said plurality of information signal tracks to the input of a corresponding one of said plural-stage storage devices, means responsive to control signals from one of said control signal tracks for transferring the information signals stored in said plural-stage storage devices consecutively to adjacent stages of said storage devices, and means responsive to a control signal from the other of said control signal tracks for thereafter reading out the information stored in said storage devices.

References Cited in the file of this patent

UNITED STATES PATENTS

| | | |
|---|---|---|
| 2,770,797 | Hamilton | Nov. 13, 1956 |
| 2,793,344 | Reynolds | May 21, 1957 |
| 2,850,234 | Bartelt et al. | Sept. 2, 1958 |